United States Patent

Morath et al.

[11] Patent Number: 6,089,985
[45] Date of Patent: Jul. 18, 2000

[54] FASTENER SORTING APPARATUS

[75] Inventors: Lawrence A. Morath; Jan A. Linthorst, both of Grosse Pointe Woods; Ronald W. Marchionni, Chesterfield; Dennis F. Custer, Clinton Township, all of Mich.

[73] Assignee: L & M Machining and Manufacturing, Inc., Warren, Mich.

[21] Appl. No.: 09/388,291

[22] Filed: Sep. 1, 1999

Related U.S. Application Data

[62] Division of application No. 08/964,802, Nov. 5, 1997, Pat. No. 6,004,215.

[51] Int. Cl.⁷ ..................................................... B21H 9/00
[52] U.S. Cl. .......................... 470/176; 470/177; 209/571; 209/604; 72/17.3
[58] Field of Search ...................................... 470/164–168, 470/176–177, 178, 179, 180; 72/17.3; 209/552, 556, 557, 558, 571–600, 604

[56] References Cited

U.S. PATENT DOCUMENTS

| | | |
|---|---|---|
| 2,273,783 | 3/1942 | Irwin . |
| 2,843,861 | 7/1958 | Gandy . |
| 2,919,632 | 1/1960 | Newstead et al. . |
| 3,097,378 | 7/1963 | Meyercordt et al. . |
| 3,146,471 | 9/1964 | Edmondson . |
| 3,548,712 | 12/1970 | Dzus et al. . |
| 3,638,260 | 2/1972 | Brown et al. . |
| 3,709,328 | 1/1973 | Mohr et al. ................................ 209/73 |
| 3,786,527 | 1/1974 | Morton et al. . |
| 3,823,822 | 7/1974 | Cochran et al. ............................ 209/80 |
| 3,978,758 | 9/1976 | Bright . |
| 4,058,864 | 11/1977 | Morland . |
| 4,184,217 | 1/1980 | Dohi . |
| 4,241,468 | 12/1980 | Burchell . |
| 4,472,956 | 9/1984 | Leistner ....................................... 72/92 |
| 4,905,842 | 3/1990 | Habele et al. ........................... 209/557 |
| 5,165,551 | 11/1992 | Frost ....................................... 209/538 |

OTHER PUBLICATIONS

*Fastener Technology International*, Apr./May 1997, p. 51 Cinco Industries, Inc, "High Speed Shave Pointing Machines".

*Primary Examiner*—Ed Tolan
*Attorney, Agent, or Firm*—Reising, Ethington, Barnes, Kisselle, Learman & McCulloch, P.C.

[57] ABSTRACT

A fastener sorting apparatus is configured to mount on a fastener forming machine and to shunt bent workpieces through a wastegate of the fastener forming machine when the bent workpieces contact a detection ring. The detection ring is electrically-conductive and is coaxially aligned with a part gripper of the forming machine. The ring has an inner diameter slightly larger than an outer diameter of a series of workpieces to be sorted. Either the ring or the gripper are moved so that a workpiece held in the gripper passes through the ring. If the workpiece is bent beyond acceptable limits it will contact the ring, closing an electrical circuit. Closing of the circuit causes a workpiece diverter to shunt the workpieces through the wastegate.

5 Claims, 10 Drawing Sheets

FASTENER SORTING APPARATUS

This application is a Division of Ser. No. 08/964,802 Nov. 5, 1997 U.S. Pat. No. 6,004,215.

TECHNICAL FIELD

This invention relates generally to a fastener-forming machine and, more particularly, to a secondary fastener-forming machine.

BACKGROUND OF THE INVENTION

Secondary fastener forming machines take cylindrical workpieces, such as headed fastener blanks that have been formed in a primary fastener forming process, and perform additional operations on the workpieces such as tapering the ends. To perform additional operations such as pointing on the blanks, some secondary forming machines drive the blanks axially along a linear forming stroke into engagement with cutters mounted on a cutting head. It is highly desirable that secondary fastener forming machines of this type include means for adjusting the length of each forming stroke to accommodate fastener blanks and other workpieces of various lengths. It is also desirable that such machines include a mechanism that senses when a blank has reached the end of its forming stroke and causes the machine to reverse and disengage the formed workpiece from the forming tool.

Optical Boring Company, the assignee of the present invention, manufactures a secondary fastener forming machine (the OBC machine) that forms pointed ends onto headed fastener blanks. The OBC machine includes a reciprocator in the form of a 2-piston hydro-pneumatic cylinder that reciprocates a reciprocating portion of the assembly including a fastener gripper upward to a fully retracted "remote" position and downward through a cutting stroke to a fully extended "proximate" position. During the lower portion of the cutting stroke the lower end of a fastener blank held in the gripper axially engages a rotating cutting tool at a cutting tool rotational axis. The cutting tool includes carbide cutting blades that are positioned around the cutting tool axis to cut a tapered conical tip on the fastener blank. One piston within the cylinder is hydraulically dampened leaving no hard linkages between the forming machine and the fastener blank being worked. This lack of hard linkages allows the downward travel of the fastener blank and gripper to slow with increased resistance during the cutting stroke and to slow further or even stop completely in response to excessive resistance. After cutting, the cylinder lifts the gripper and extracts the fastener from the cutting tool, completing a cutting cycle. The OBC machine also includes a part transfer mechanism that inserts and ejects parts. The reciprocal motion of one of the pistons within the hydro-pneumatic cylinder drives the part transfer mechanism.

An adjustable screw axially engages a limit switch whenever a fastener has reached the end of its forming stroke. When the limit switch is thus activated it signals the reciprocator to reverse the reciprocating portion of the assembly and disengage the newly-tipped fastener from the cutters. The screw may be advanced or retracted to adjust the reversal point of the cylinder at the end of the cutting stroke.

While a reciprocator of this type provides many advantages it cannot consistently terminate the downward forming/cutting stroke at the same proximate position within acceptable tolerances. If cycle speed is increased for any reason, the reciprocating portion of the assembly and the fastener blank can overshoot the proximate position resulting in a deeper cut on the fastener. Conversely, if cycle speed decreases for any reason, the reciprocating portion may undershoot the desired reversal point resulting in a shallower cut on the fastener. Cycle speed will tend to decrease over time as the cutters begin to get dull from repeated cutting cycles. The cycle speed slows because the force required to advance each fastener blank into the cutters increases while the pneumatic pressure supply remains relatively constant. In addition, small variations in pneumatic pressure supply are common with most industrial air compressor systems and can result in cutting depth variations that are unacceptable in certain applications.

What is needed is a hydro-pneumatically driven fastener forming machine that, without hard linkages, moves fastener blanks through a forming stroke while positively and consistently maintaining the end-of-stroke stopping position, i.e., the "proximate" position of each workpiece relative to the forming tool. What is also needed is such a machine that can accommodate bolts of various lengths.

SUMMARY OF THE INVENTION

In accordance with the present invention a hydro-pneumatically driven fastener forming apparatus for forming fasteners from cylindrical workpieces comprises a positive stop. The positive stop prevents a reciprocating portion of the apparatus from causing workpieces to overshoot or undershoot a proximate position relative to a forming tool. The apparatus includes a workpiece gripper supported for reciprocal movement along a forming axis and configured to releasably grip and carry a generally cylindrical workpiece in a coaxial disposition along the forming axis. The forming tool is spaced from the gripper along the forming axis. At least one of the part gripper and tool is supported for relative reciprocal motion along the axis between a remote position and the proximate position. The gripper and tool are disposed farther apart in the remote position than in the proximate position. The assembly also includes a workpiece transfer mechanism configured to sequentially transfer a series of workpieces into the workpiece gripper and to drive preceding workpieces out of the workpiece gripper and onto an exit path. A reciprocator is operatively connected to the reciprocating portion of the apparatus. The reciprocating portion of the apparatus comprises one of the workpiece gripper and tool. The reciprocator drives one of the workpiece gripper and tool between the extended and retracted positions. The reciprocator has a stationary end connected to a stationary support and a reciprocating end operatively connected to the reciprocating portion of the apparatus. The stationary end is hydro-pneumatically coupled to the reciprocating end. The motion of the reciprocating end and the reciprocating portion of the apparatus are hydraulically dampened. The positive stop includes a reciprocating stop surface disposed on the reciprocating portion of the apparatus in a position to engage a stationary stop surface when the workpiece gripper and tool are in the proximate position.

In accordance with another aspect of the invention the reciprocating stop surface is disposed on a reciprocating stop that is adjustably connected to the reciprocating portion of the apparatus. The position of the reciprocating stop relative to the reciprocating portion of the apparatus is adjustable in a direction parallel to the forming axis to allow an operator to adjust the extended position.

In accordance with another aspect of the invention the reciprocator includes a lower limit switch disposed in the path of the reciprocating portion of the apparatus. The lower limit switch is actuable by contact with the reciprocating portion of the apparatus in the extended position. The lower limit switch is configured to send a signal in response to actuation that causes the reciprocator to reverse direction.

In accordance with another aspect of the invention the lower limit switch is supported adjacent the stationary stop. The lower limit switch includes a plunger actuator that extends through an aperture in the stationary stop surface.

In accordance with another aspect of the invention the reciprocator includes a compound hydro-pneumatic cylinder connected between the stationary end and the reciprocating end of the reciprocator.

In accordance with another aspect of the invention the hydro-pneumatic cylinder is connected to a stationary support. A reciprocating piston rod extends from a piston within the cylinder and operatively connects to the workpiece gripper.

In accordance with another aspect of the invention reciprocal motion of the reciprocator drives the workpiece transfer mechanism.

In accordance with another aspect of the invention a rotator is operatively connected to one of the workpiece gripper and the tool to rotate one of the workpiece gripper and the tool about the axis.

In accordance with another aspect of the invention the tool is supported on the rotator to rotate the tool about the axis and the gripper is supported on the reciprocator.

In accordance with another aspect of the invention the tool includes cutters disposed adjacent the axis in a position to cut one end of a workpiece held in the gripper as the gripper and cutting tool approach the proximate position.

In accordance with another aspect of the invention the tool includes a drill aligned with the axis in a position to drill a hole into one end of a workpiece held in the gripper as the gripper and cutting tool approach the proximate position.

In accordance with another aspect of the invention the tool includes a broacher aligned with the axis in a position to broach a hole preformed into one end of a workpiece held in the gripper as the gripper and cutting tool approach the proximate position.

In accordance with another aspect of the invention the forming implement is an implement that alters the configuration of a previously formed hole in a workpiece, and the assembly includes an electronic controller configured to detect workpieces that lack the previously formed hole. The electronic controller may comprise a precision logic control that is programmed to cause the assembly to reject workpieces by, for example, opening a wastegate in the exit chute. The precision logic control may be programmed to detect the absence of a hole when the forming stroke takes longer than a predetermined maximum time.

In accordance with another aspect of the invention the tool includes a tool adapter head configured to releasably engage forming implements.

In accordance with another aspect of the invention the tool adapter head includes a pair of cutter receptacles for releasably engaging cutters.

In accordance with another aspect of the invention the tool adapter head includes a chuck receptacle for releasably engaging a collet chuck for supporting drill bits, broachers and the like.

In accordance with another aspect of the invention the assembly includes a height adjuster connected between the reciprocating portion and the stationary portion. The height adjuster is configured to allow an operator to adjust forming depth by adjusting the relative distance between the reciprocating and stationary portions as measured along the forming axis in the proximate position.

In accordance with another aspect of the invention the assembly includes a sorter attachment comprising an electrically-conductive ring coaxially supported on the forming tool and coaxially aligned with and spaced from the part gripper. The ring is pre-selected to have an inner diameter slightly larger than an outer diameter of a series of workpieces to be sorted. The ring is configured to encircle a portion of a relatively straight workpiece held in the gripper when the gripper and ring are in the proximate position, the workpiece being withdrawn from the ring when the gripper and ring are in the remote position. The ring, support frame 36, reciprocator, gripper and a workpiece held in the gripper define an open electrical circuit that is closed only when a workpiece contacts the ring. An electrical power source is connected into the circuit. An electrically actuated workpiece diverter is also connected into the circuit and is mechanically supported adjacent the workpiece exit path. The workpiece diverter is operable to shunt bent workpieces away from the exit path when the bent workpieces contact the ring and complete the electrical circuit.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
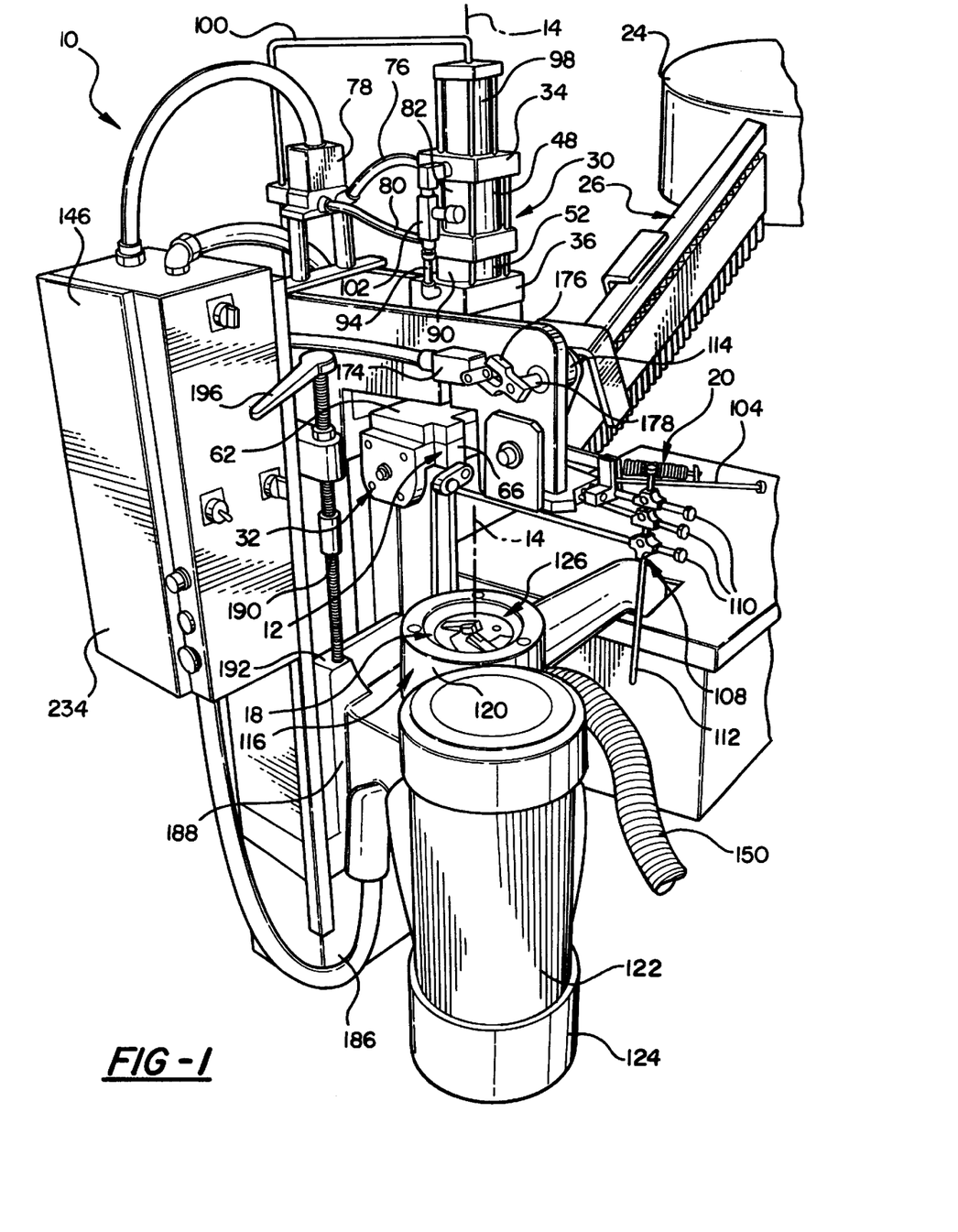
FIG. 1 is a perspective view of a fastener forming apparatus constructed according to the invention.
Figure 7:
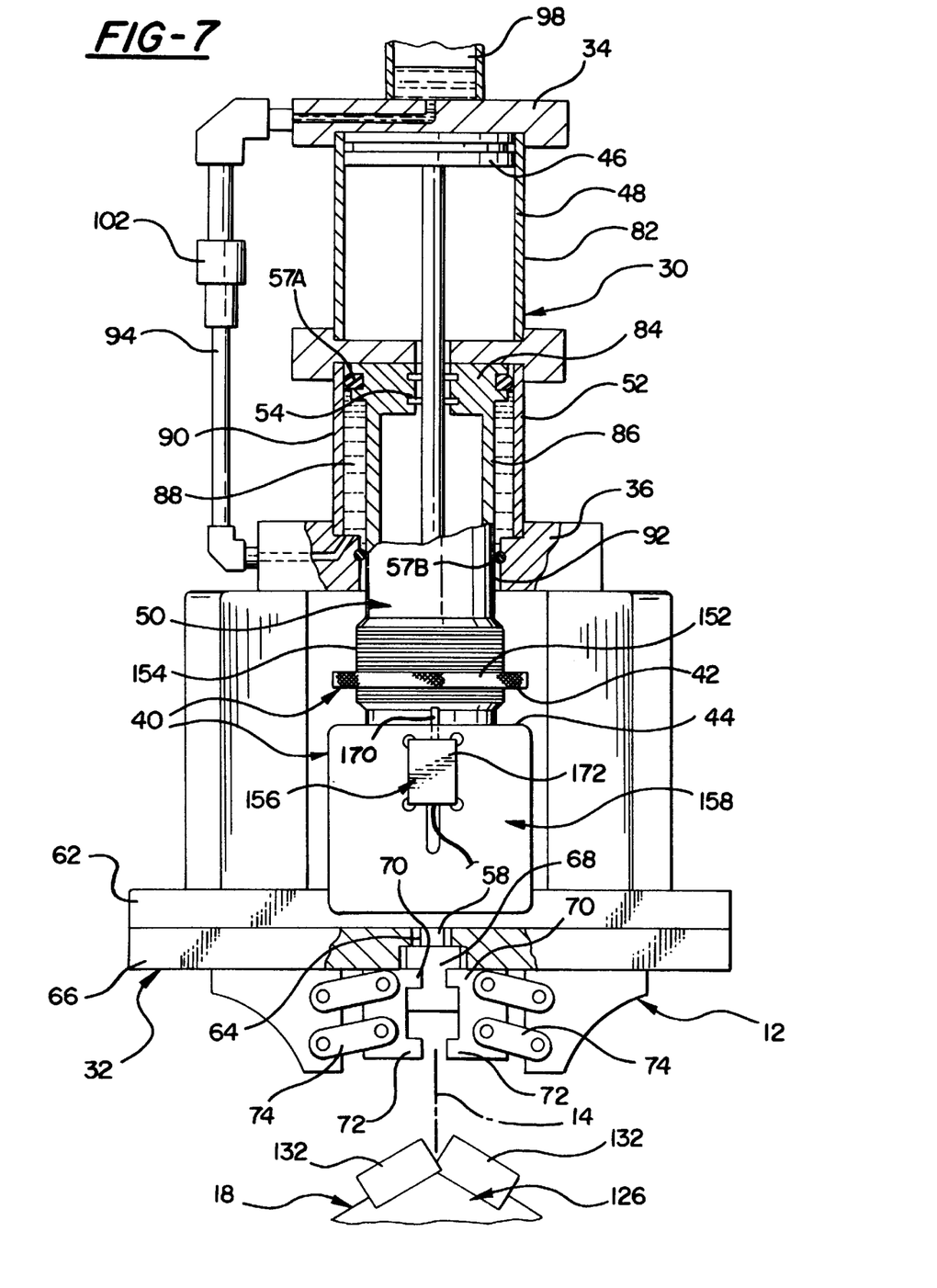
FIG. 7 is a fragmentary partially broken-away front view of the fastener forming apparatus of FIG. 1 with upper and lower pistons of a compound hydro-pneumatic cylinder of the apparatus at the top of their respective travels.
Figure 8:
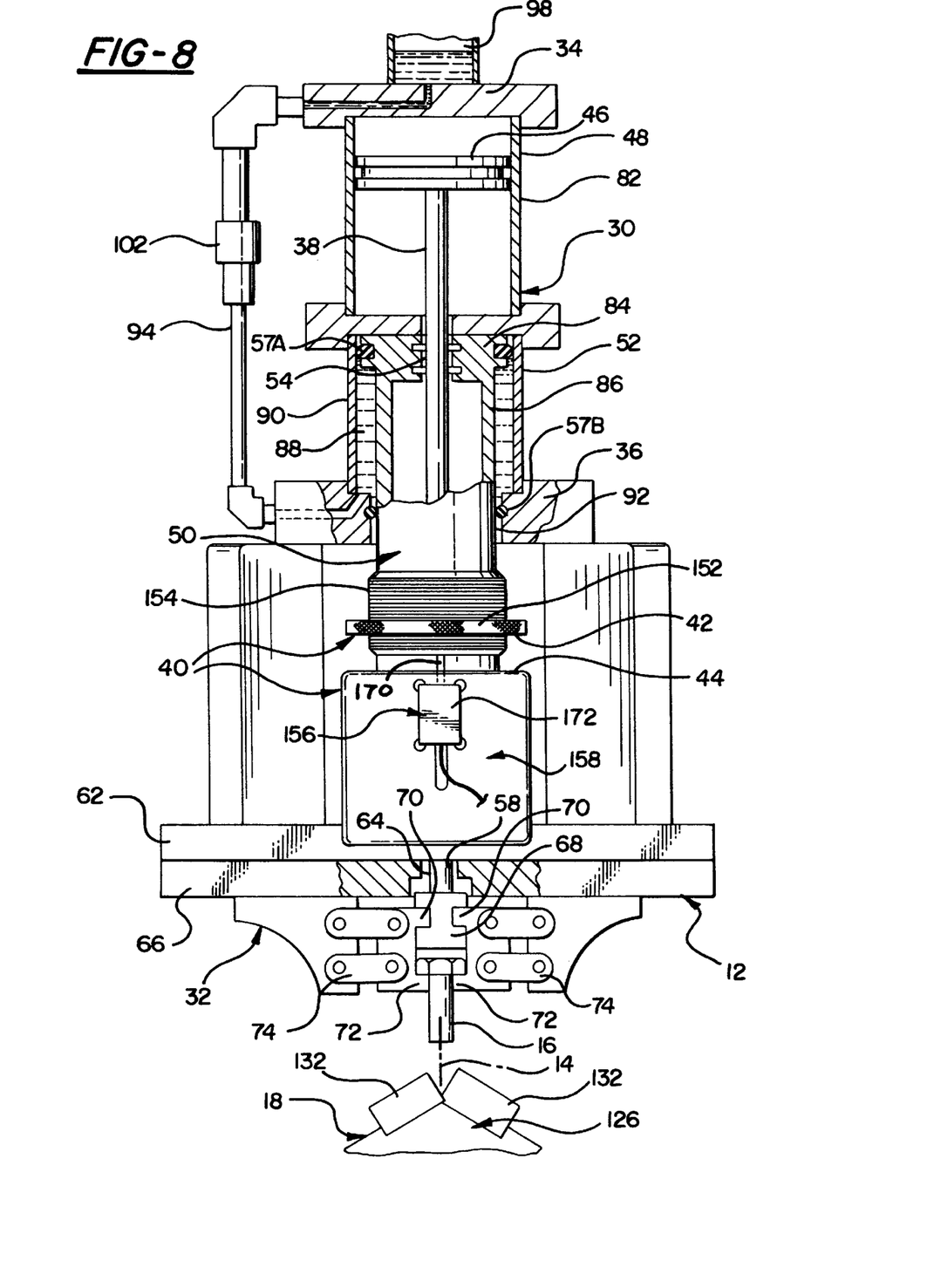
FIG. 8 is a fragmentary partially broken-away front view of the fastener forming apparatus of FIG. 1 with the upper pistons of the compound hydro-pneumatic cylinder positioned part way downward on the initial portion of a downward forming stroke.
Figure 9:
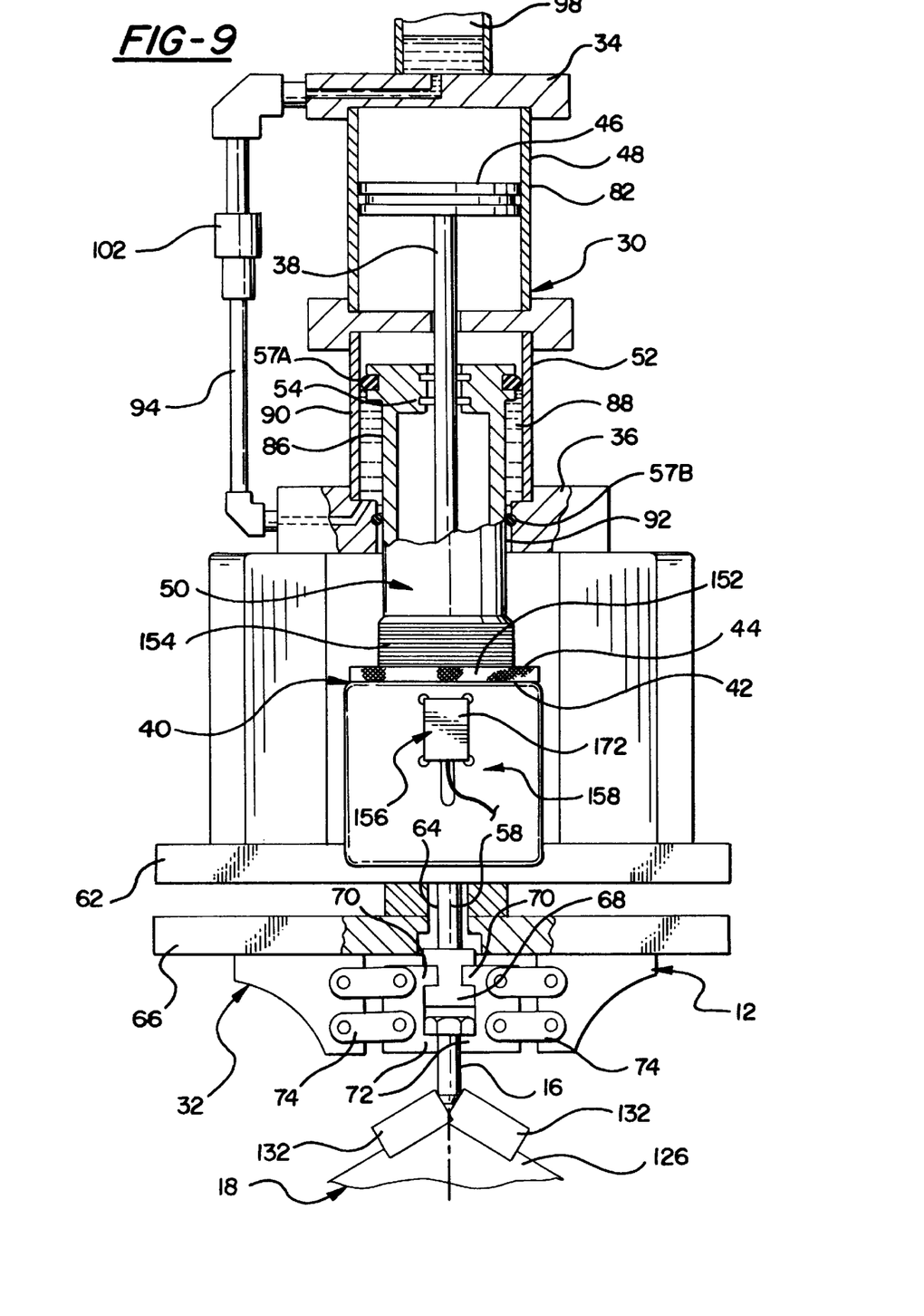
FIG. 9 is a fragmentary partially broken-away front view of the fastener forming apparatus of FIG. 1 with upper and lower pistons of a compound hydro-pneumatic cylinder of the apparatus at the bottoms of their respective travels at the end of the downward forming stroke.

A fastener forming apparatus for forming fasteners from headed cylindrical workpieces 16 is generally shown at 10 in FIG. 1. The apparatus 10 comprises a workpiece gripper or grip chuck, generally indicated at 12 in FIGS. 1,2 and 7–9. The grip chuck 12 is supported for reciprocal movement along a forming axis shown at 14 in FIGS. 1–9. The reciprocal movement includes alternating downward cutting strokes and upward return strokes. The grip chuck 12 is configured to releasably grip and carry a generally cylindrical workpiece 16 in a coaxial disposition along the forming axis 14. A forming tool, generally shown at 18 in FIGS. 1, 2, 4, 5 and 9, is spaced vertically below the grip chuck 12 along the forming axis 14. The grip chuck 12 is supported for reciprocal motion along the forming axis 14 between a remote position shown in FIG. 7 and a proximate position shown in FIG. 9. As shown in FIGS. 7 and 9, the grip chuck 12 and forming tool 18 are disposed farther apart in the remote position than in the proximate position. In the proximate position shown in FIG. 9 the workpiece is engaged with the forming tool 18 and is at the end of its downward cutting stroke.

Figure 2:
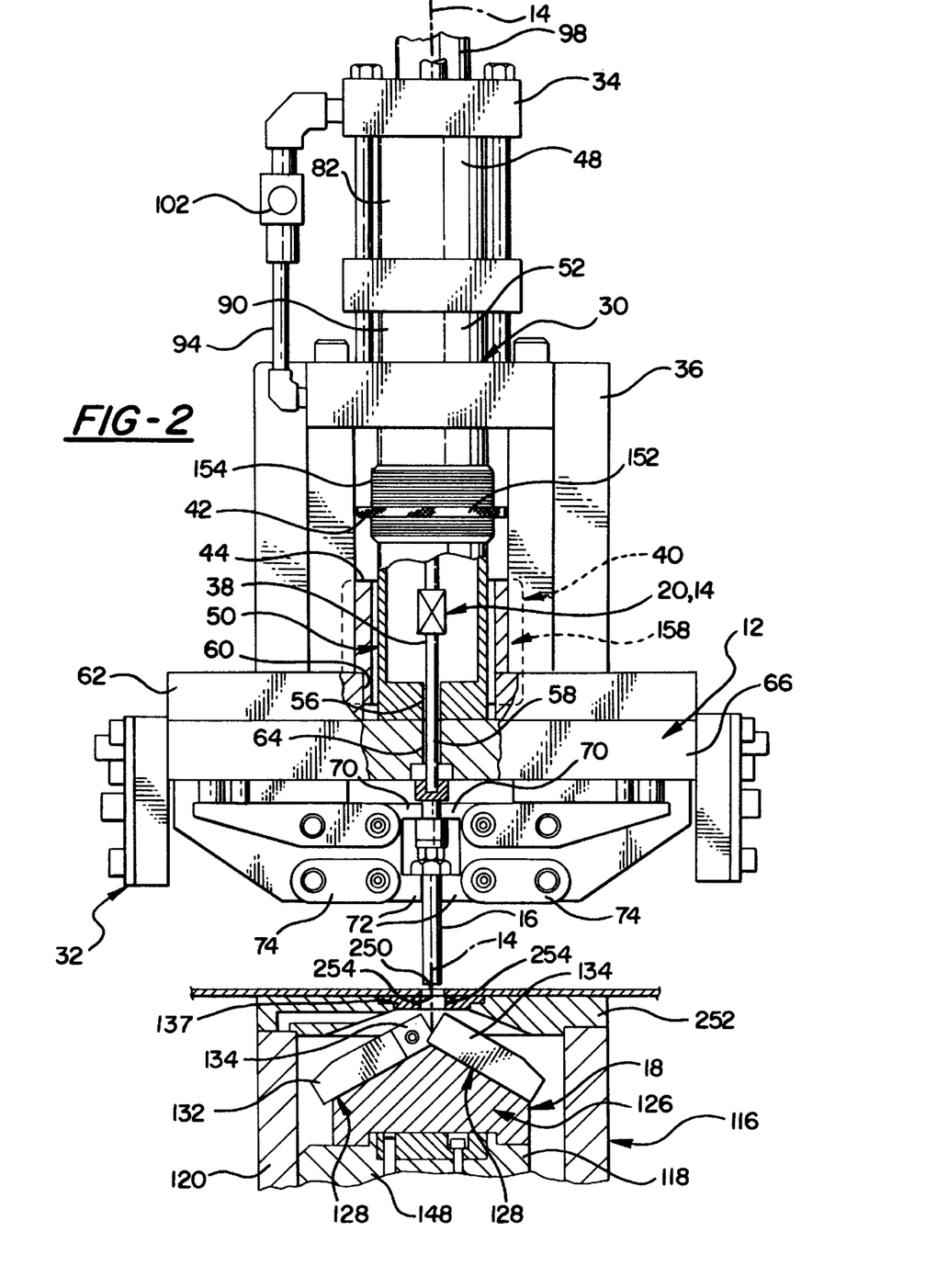
FIG. 2 is a fragmentary partially broken-away front view of the fastener forming apparatus of FIG. 1.
Figure 3:
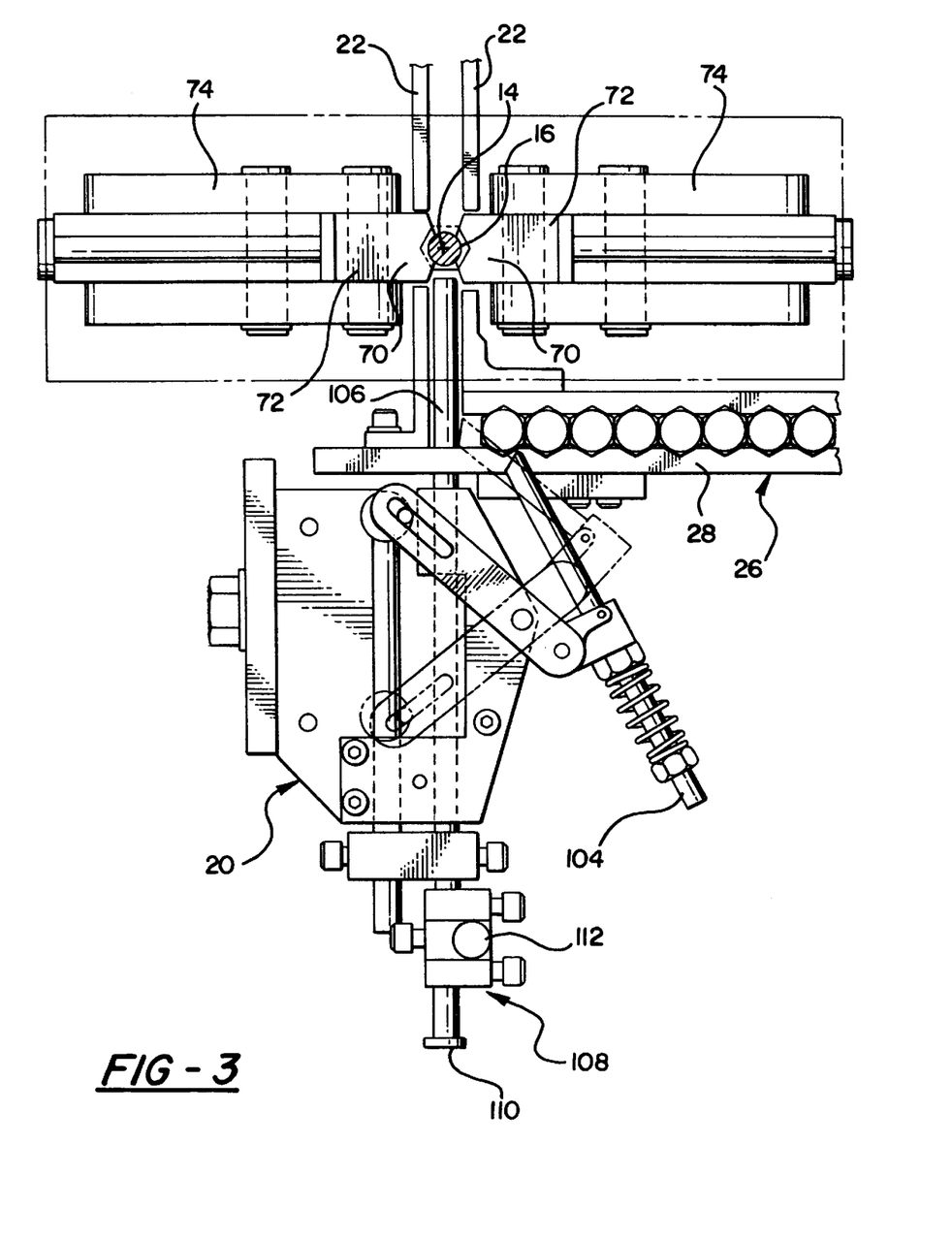
FIG. 3 is a fragmentary top view of a workpiece transfer portion of the fastener forming apparatus of FIG. 1.

The apparatus 10 also includes a workpiece transfer mechanism 20 generally indicated at 20 in FIGS. 1–3. The workpiece transfer mechanism 20 is configured to sequentially drive formed workpieces 16 out of the grip chuck 12 by transferring unformed workpieces 16 into the grip chuck 12 when the grip chuck 12 is in the remote position. The formed workpieces 16 are driven from the grip chuck 12 onto an exit chute shown at 22 in FIG. 3. The transfer mechanism 20 receives workpieces 16 from a spiral track (not shown) in a vibrating bowl 24 that feeds the workpieces 16 into a downwardly sloping load chute 26. The workpieces slide by gravitational force down the sloping load chute 26 to a level "landing" portion 28 of the load chute 26. The landing portion 28 of the load chute 26 is disposed adjacent the transfer mechanism 20, tangential to the forming axis 14 and is spaced from the forming axis 14.

A reciprocator in the form of a compound hydro-pneumatic cylinder, generally indicated at 30 in FIGS. 1, 2 and 7–9, is operatively connected to a reciprocating portion of the apparatus 10 generally indicated at 32 in FIGS. 1, 2 and 7–9. The reciprocating portion 32 of the apparatus 10 comprises the grip chuck 12. The hydro-pneumatic cylinder 30 drives the grip chuck 12 and workpiece 16 between the extended and retracted positions. Reciprocal motion driven by the compound cylinder 30 also operates the workpiece transfer mechanism 20. The compound hydro-pneumatic cylinder 30 has a stationary end shown at 34 in FIGS. 1, 2 and 7–9 that is connected to a stationary support frame 36. The compound hydro-pneumatic cylinder 30 has a reciprocating end in the form of a piston rod shown at 38 in FIGS. 2 and 7–9. The piston rod 38 is operatively connected to the reciprocating portion 32 of the apparatus 10 at the grip chuck 12. As is described in greater detail below, the piston rod 38 is hydro-pneumatically coupled to the support frame 36 through the compound hydro-pneumatic cylinder 30 for a portion of its downward travel on the forming stroke. Therefore, for that portion of the forming stroke, the motion of the piston rod 38 and the grip chuck 12 is hydraulically dampened.

The apparatus 10 also comprises a downstroke positive stop generally indicated at 40 in FIGS. 2 and 7–9. The positive stop 40 includes a reciprocating stop surface and a stationary stop surface shown at 42 and 44, respectively, in FIGS. 2 and 7–9. The reciprocating stop surface 42 is disposed on the reciprocating portion 32 of the apparatus 10 in a position to engage the stationary stop surface 44. The stationary stop surface 44 is supported on a portion of the stationary support frame 36 in vertical alignment with the reciprocating stop surface 42 when the grip chuck 12 and tool 18 are in the proximate position. The positive stop 40 prevents the compound hydro-pneumatic cylinder 30 from causing the reciprocating portion 32 of the apparatus 10 to overshoot the extended position which prevents workpieces 16 from advancing too far into the forming tool 18 and being over-cut.

The compound hydro-pneumatic cylinder 30 is connected between the stationary support frame 36 and the reciprocating end of the reciprocator, i.e., the piston rod 38. The compound pneumatic-hydraulic cylinder 30 reciprocates the workpiece 16 and the grip chuck 12 through the downward forming stroke and the upward return stroke with the workpiece 16 moving along the forming axis 14. The compound hydro-pneumatic cylinder 30 is pneumatically driven through an upper piston shown at 46 in FIGS. 7–9. The upper piston 46 is mounted within a pneumatic cylinder 48 of the compound cylinder 30 and is hydraulically dampened for a portion of the forming stroke by an annular lower piston generally indicated at 50 in FIGS. 2 and 7–9. The lower piston 50 is slidably supported within a hydraulic cylinder 52 of the compound cylinder 30.

As best shown in FIG. 2, the piston rod 38 extends downward from the upper piston 46 and operatively connects to the grip chuck 12. The piston rod 38 is fastened to the upper piston 46 and is slidably disposed through upper and lower tubular channels 54, 56 of the annular lower piston 50. The upper tubular channel 54 is shown in FIGS. 7–9 and the lower tubular channel is shown in FIG. 2. The tubular channels 54, 56 each includes at least one O-ring seal 57. The O-ring seals 57 provide fluid-tight seals between the lower piston 50 and the piston rod 38. As shown in FIGS. 7–9, a lower end 58 of the piston rod 38 passes through an upper guide hole 60 in a generally rectangular bronze guide plate 62 that is supported on the support frame 36. The lower end 58 of the piston rod 38 then passes through a lower guide hole 64 in a steel cross bar portion 66 of the grip chuck 12 and connects to a plunger 68.

As shown in FIGS. 2, 3 and 7–9, the plunger 68 is slidably disposed within the lower guide hole 64 in the cross bar portion 66 of the grip chuck 12. The plunger 68 is configured to engage both a top surface or head of the unformed workpiece 16 and laterally inwardly extending arm portions 70 of a pair of opposing grip jaws 72. The grip jaws 72 are mounted to the cross bar 66 via parallelogram-type linkages 74. The parallelogram linkages 74 support the grip jaws 72 in such a way that downward pressure from the plunger 68 forces the jaws 72 downward in relation to the cross bar 66 and inward in relation to each other and into an over-center "gripped" position. In the gripped position, the grip jaws 72 clamp onto the shaft portion of an unformed workpiece 16 positioned between them. The grip jaws 72 are shown in the gripped position in FIGS. 2, 3, 8 and 9. Conversely, the plunger 68 is configured to draw upward on the laterally inwardly extending arm portions 70 of the grip jaws 72 on the return stroke, moving the grip jaws 72 over-center to their open position and releasing the workpiece 16 positioned between them. The grip jaws 72 are shown in their open position in FIG. 7.

An upper air supply tube shown at 76 in FIG. 1 connects a solenoid air diverter valve 78 to an upper portion of the pneumatic cylinder 48 above the upper piston 46. A lower air supply tube 80 connects the solenoid air diverter valve 78 to a lower portion of the pneumatic cylinder 48 below the upper piston 46. The diverter valve 78 is electrically actuated to alternately direct pressurized air through the upper and lower air supply tubes 76, 80 and into upper and lower portions of the pneumatic cylinder 48, respectively. Air directed to the upper portion of the pneumatic cylinder 48 forces the upper piston 46 downward on the forming stroke. Air directed to the lower portion of the pneumatic cylinder 48 forces the upper piston 46 upward on the return stroke.

A cylinder wall 82 of the hydraulic cylinder 52 is supported on a portion of the support frame 36 that is connected to the stationary bronze guide plate 62. The lower piston 50 includes a generally disk-shaped portion 84 and a cylindrical portion 86 that extends concentrically and integrally downward from the disk-shaped portion 84 to the cross-bar portion 66 of the grip chuck 12. The cylindrical portion 86 of the lower piston 50 concentrically surrounds the piston rod 38 and is fastened to the cross-bar portion 66 of the grip chuck 12 at a lower end of the cylindrical portion 86.

The outer circumference of the cylindrical portion 86 of the lower piston 50 is smaller than an outer circumference of the disk-shaped portion 84 and defines a hydraulic oil-filled annular chamber 88. The annular chamber 88 is disposed between an outer cylinder wall 90 of the hydraulic cylinder 52 and an outer surface of the cylindrical portion 86 of the lower piston 50. An upper O-ring seal 57A is supported in a recess formed into the outer circumference of the lower piston 50. The upper O-ring seal 57A seals the disk-portion 84 of the lower piston 50 against the hydraulic cylinder wall 90. A lower O-ring seal 57B is supported in a recess formed into an inner circumference of a circular aperture 92 in the support frame 36. The lower O-ring seal 57B seals the circular aperture in the support frame 36 against the cylindrical portion 86 of the lower piston 50. The upper and lower O-ring seals 57A, 57B cooperate to prevent hydraulic oil from escaping the annular chamber 88.

As shown in FIGS. 1, 2 and 7–9, a metal hydraulic tube 94 connects the annular chamber 88 of the hydraulic cylinder 52 and a pneumatically-pressurized hydraulic reservoir 98 that is supported on the pneumatic cylinder 48. The hydraulic tube 94 provides a fluid channel between the annular chamber 88 and the hydraulic oil reservoir 98. The hydraulic oil reservoir 98 is pressurized by air delivered from a pressurized air source (not shown) through a reservoir air supply tube shown at 100 in FIG. 1. A manually-adjustable Parker hydraulic dampening valve (part no. F600B) 102 is connected approximately midway along the length of the hydraulic tube 94. The dampening valve 102 is configured to adjustably restrict only the flow of hydraulic oil from the annular chamber 88 to the reservoir 98. The dampening valve 102 does not restrict oil flow from the reservoir 98 to the annular chamber 88. Because the lower piston 50 is hydraulically dampened and no hard linkages exist between the stationary support frame 36 and the workpiece 16, the reciprocal motion of the compound hydro-pneumatic cylinder 30 slows with increased resistance and stops with too much resistance rather than jamming or breaking.

As explained above, a vibrating bowl 24 feeds unformed workpieces 16 into a downwardly sloping load chute 26. The workpieces 16 come to rest in a level landing portion 28 of the load chute 26 adjacent the workpiece transfer mechanism 20. The workpiece transfer mechanism 20 includes a separator rod shown at 104 in FIGS. 1 and 3. The separator rod 104 is supported adjacent the landing portion 28 of the load chute 26. The separator rod 104 pushes each unformed workpiece 16, one at a time, from the landing portion 28 of the load chute 26 into a staging position 106 adjacent the grip jaws 72. The separator rod 104 then retracts and an injector assembly, generally indicated at 108 in FIGS. 1 and 3, pushes each unformed workpiece 16, one at a time, from the staging position 106 into a grip position between the open grip jaws 72. Each newly injected workpiece 16 strikes a newly formed workpiece 16 still disposed between the grip jaws 72 and forces the newly formed workpiece 16 onto the declined exit chute 22. Each newly formed workpiece 16 slides down the declined exit chute 22 and into a bin.

The injector assembly 108 includes between one and four horizontal inserter rods 110 removably attached along a vertical support rod 112. After each unformed workpiece 16 has been deposited in the staging position 106, the inserter rods 110 are driven axially into the unformed workpiece 16, pushing the unformed workpiece 16 into the grip position between the grip jaws 72. The number of inserter rods 110 used depends on the length of the workpieces 16 in a given parts run. The longer the workpiece 16, the greater the number of inserter rods 110 attached to the vertical support rod 112.

The workpiece transfer mechanism 20 also includes a pivot linkage, shown at 114 in FIG. 1, that connects the separator rod 104 and injector assembly 108 to the piston rod 38 through a rectangular window (not shown) in the cylindrical portion 86 of the lower piston 50. This pivot linkage 114 uses the downward motion of the upper piston 46 to drive the separator 104 and inserter rods 110 of the transfer mechanism 20. Driven by the pivot linkage 114, the transfer mechanism 20 simultaneously introduces an unformed workpiece 16 between the jaws 72 of the grip chuck 12 and ejects a completed workpiece 16 to the exit chute 22.

It is the first portion of the downward motion of the piston shaft 38 that the pivot linkage 114 transfers to the separator 104 and inserter rods 104, 110. Because the pivot linkage 114 uses the first portion of the downward forming stroke motion, the transferred motion is relatively rapid. This is because the motion of the upper piston 46 and piston rod 38 are not hydraulically dampened during the first portion of the forming stroke and the workpiece 16 is not yet in contact with the forming tool 18. Therefore, although the upper piston 46 slows in its downward movement when the forming tool 18 contacts and is forming the workpiece 16, this resulting slower motion of the piston rod 38 does not limit the speed at which the transfer mechanism 20 inserts individual workpieces 16.

A rotator, generally indicated at 116 in FIGS. 1 and 2, is operatively connected to the tool 18 to rotate the tool 18 about the forming axis 14. The rotator 116 includes a cylindrical spindle and case, shown at 118 and 120, respectively, in FIG. 2. The spindle 118 is rotatably supported on the forming axis 14 within the cylindrical case 120. The rotator 116 also includes a Reliance electric spindle motor (part no. PZIF1005), shown at 122 in FIG. 1, is drivingly connected to the spindle 118 through a Reeves drive system (part no. R376281001) 124. The motor 122 is drivingly connected to the spindle 118 through the drive system 124.

Figures 4, 5, 6:
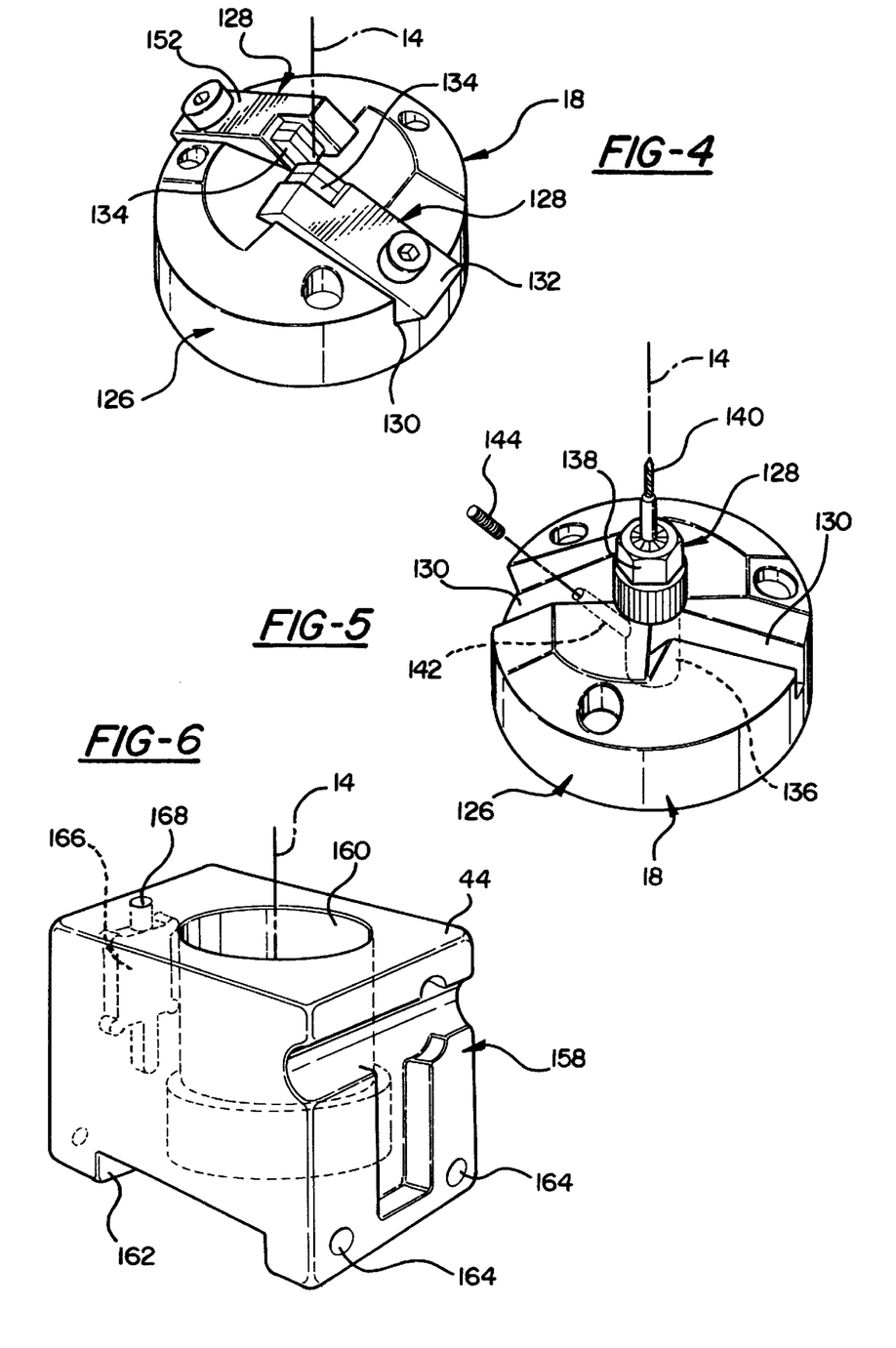
FIG. 4 is a perspective view of a forming tool adapter head of the fastener forming apparatus of FIG. 1 with cutting blocks installed.
FIG. 5 is a perspective view of the forming tool adapter of FIG. 4 with cutting blocks removed and a collet chuck and drill bit installed.
FIG. 6 is a perspective view of a block portion of a positive stop feature of the fastener forming apparatus of FIG. 1.

The forming tool 18 is supported on the spindle 118 to rotate the tool 18 about the forming axis 14 in the path of workpieces 16 being lowered along the forming axis 14 by the grip chuck 12 and the compound hydro-pneumatic cylinder 30. The forming tool 18 includes a generally flat-based dome-topped circular tool adapter head generally indicated at 126 in FIGS. 1, 2, 4, 5 and 9. As is best shown in FIGS. 4 and 5 the tool adapter head 126 is configured to releasably engage forming implements 128. The tool adapter head 126 fastens at its base to the top of the spindle 118.

The tool adapter head 126 includes a pair of cutter receptacles, shown at 130 in FIGS. 4 and 5, for releasably engaging forming implements 128 such as cutter blocks 132 supporting carbide cutting blades 134. When cutter blocks are fastened into the receptacles, the cutting blades 134 are disposed adjacent the forming axis 14 in a position to cut one end of a workpiece 16 held in the grip jaws 72 as the grip chuck 12 approaches the proximate position. The cutting blades 134 are positioned to cut a tapered conical tip on a cylindrical workpiece 16 inserted axially downward between the blades 134 as shown in FIG. 9.

The tool adapter head 126 accepts cutter blocks 132 having cutting blades 134 that are twice the size of standard cutting blades used with workpiece-pointing machines. The larger cutting blades 134 produce bigger chips & less heat while cutting. The larger cutting blades 134 absorb more heat energy during cutting than would small cutter blades because the larger blades 134 cut larger chips from the workpieces 16. By cutting larger chips there is less friction and therefore less frictional heat generated for a given mass of chips. The amount of heat energy retained within the larger metal fragments removed from the workpiece together with the amount of heat energy retained in the larger cutting tool 18 eliminates the need to cool each workpiece 16 after cutting.

As shown in FIG. 5 the tool adapter head 126 also includes a chuck receptacle 136 for releasably engaging a collet chuck 138 configured to interchangeably hold hole-forming implements 128 such as drill bits 140, broachers (not shown), reamers (not shown) and the like. The collet chuck 138 is a Series GM70 spring collet chuck available from ETM under Collet Chuck Cat. No. 690099. The chuck receptacle 136 includes a circular chuck shaft formed coaxially into the tool adapter head 126 and having a diameter slightly greater than the ⅝" shank diameter of the collet chuck 138 to slidably receive the collet chuck 138 within the shaft. A diagonal screw shaft shown at 142 in FIG. 5 extends inward from an upper surface of the tool adapter head 126 and intersects the chuck shaft. A lower end of the screw shaft is interiorly threaded. A set screw 144 is disposed within the diagonal screw shaft 142 in threaded engagement with the screw shaft 142 and can be advanced down the screw shaft 142 to anchor the collet chuck 138 within the collet shaft.

When a drill bit 140 is clamped in the rotating collet chuck 138, the bit 140 is aligned with the forming axis 14. On each forming stroke, the bit drills a hole into one end of a workpiece 16 held in the grip jaws 72 as the grip chuck 12 approaches the proximate position relative to the forming tool 18. Similar to a drill bit 140, when a broacher is clamped in the collet chuck 138, the broacher is aligned with the forming axis 14. During each forming stroke, the broacher broaches a hole previously formed in one end of a workpiece 16 held in the grip jaws 72 as the grip chuck 12 approaches the proximate position.

When drill bits and other such tools are used, they will generally project upward through an aperture 250 in a disk-shaped rotator cover 252 as shown in FIG. 2. A pair of diametrically opposed fiber optic eyes 254 are disposed within an inner circumference of the aperture 250. When an upwardly projecting tool, such as a drill bit, breaks, light will be able to pass from one of the eyes 254 to the other completing a fiber optic circuit and signalling an electronic controller to shut down the machine 10.

The apparatus 10 includes an electronic controller in the form of a precision logic control (PLC) 146 programmed to detect workpieces 16 that lack a previously formed hole. When a forming implement that alters the configuration of a previously formed hole in a workpiece 14 (such as a broacher or a reamer) is installed in the collet chuck 138, the PLC 146 will detect and reject defective workpieces 16 that lack holes. The PLC 146 is programmed to detect and reject workpieces 16 that are present in the grip jaws 72 whenever the forming stroke takes longer than a predetermined maximum time. When the forming stroke takes too long it generally indicates that the broacher or reamer has encountered a workpiece surface without a hole to broach or ream and the hydro-pneumatic cylinder 30 has stalled.

Figure 13:
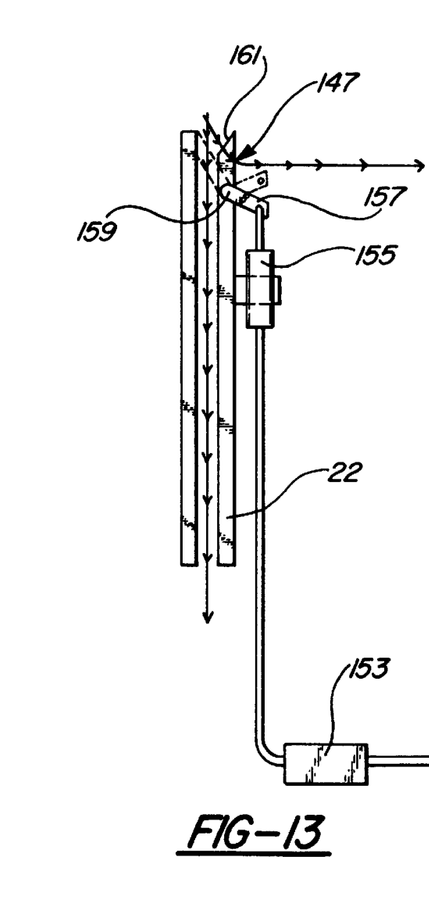
FIG. 13 is a fragmentary diagrammatic top detail view of region "A" in FIG. 12 showing the wastegate feature of the fastener forming apparatus of FIG. 12.

The PLC 146 ejects defective workpieces by signaling a wastegate, shown at 147 in FIG. 13, in the exit chute 22 to open. As the defective workpieces slide down the exit chute 22 they strike the wastegate 147. The wastegate 147 deflects defective workpieces causing them to fall from the chute 22 through a waste chute 149 and into a waste bin 151. To actuate the wastegate 147 the PLC 146 signals a solenoid air valve 153 to send pressurized air to an air cylinder 155. The air cylinder 155 is connected to an arm 157 of the wastegate 147 and causes the wastegate 147 to pivot around a pivot point 159. As the wastegate 147 pivots, a diverter portion 161 of the wastegate 147 swings into the exit chute 22.

Figure 11:
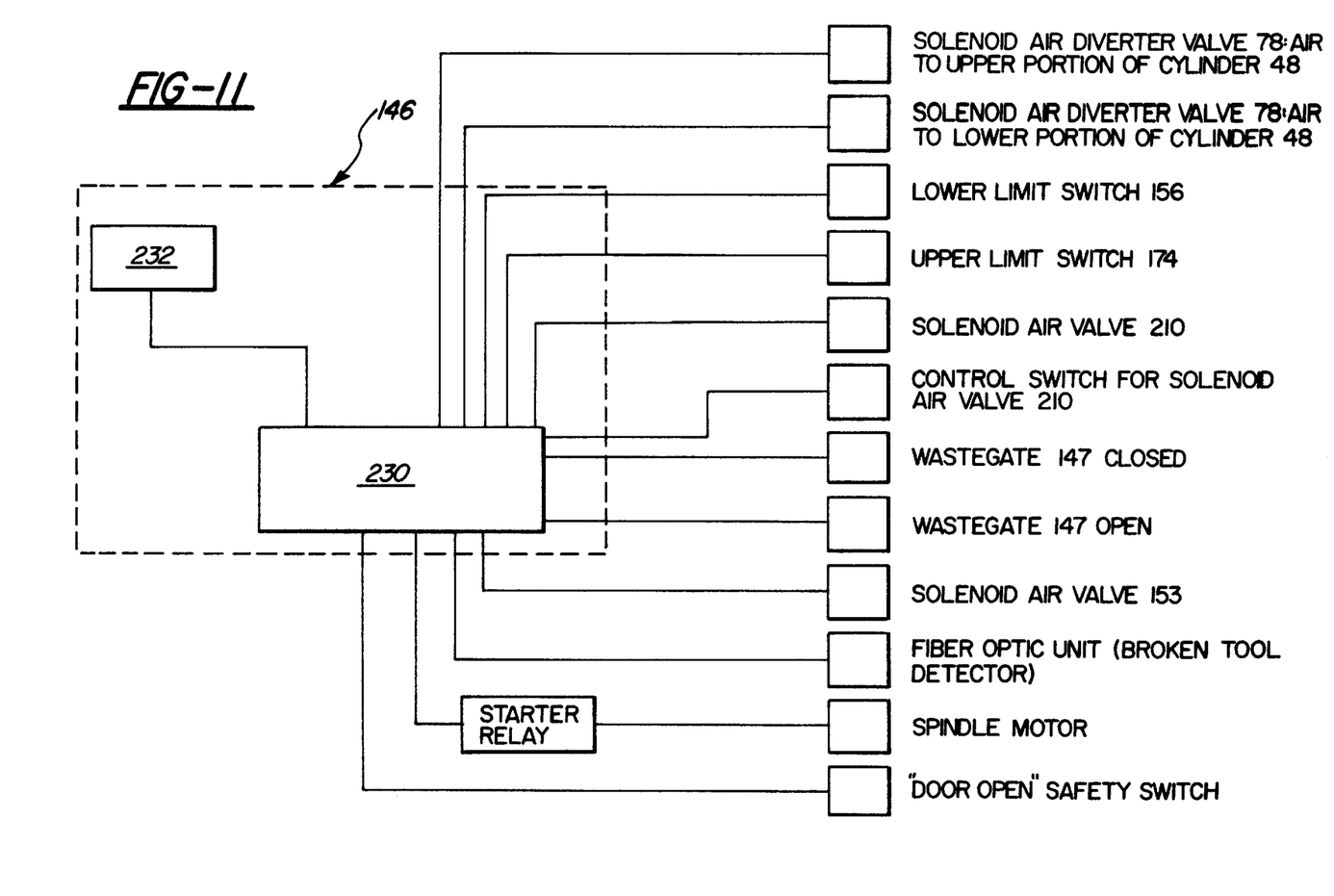
FIG. 11 is a block diagram of a precision logic control feature of the fastener forming apparatus of FIG. 1.
Figure 12:
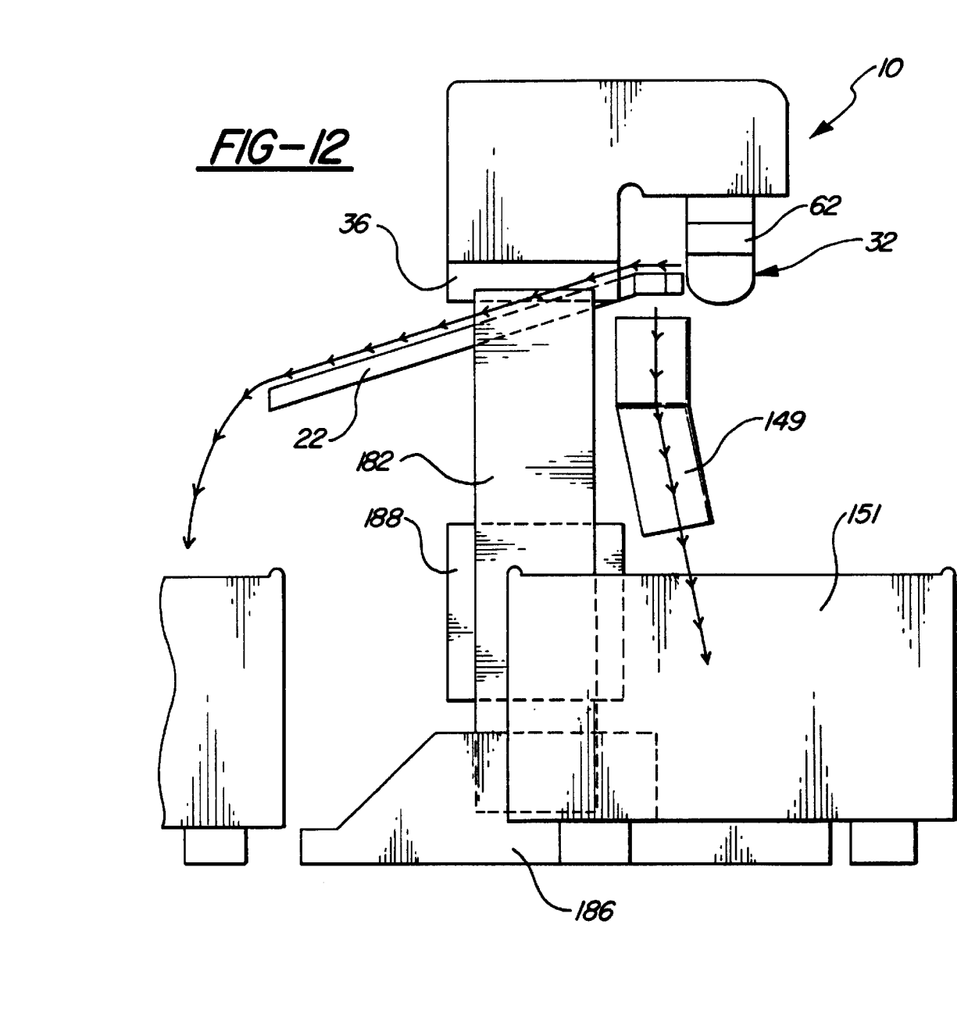
FIG. 12 is a diagrammatic side view of the fastener forming apparatus of FIG. 1 with a wastegate feature installed.

As shown in the block diagram of FIG. 11, the PLC 146 includes an Allen Bradley SLC 5/01 processor 230 and a Panelview 550 operator interface 232 with an LCD display. The PLC is enclosed in a 24"×24"×8" electrical enclosure shown at 234 in FIG. 1. Also included in the PLC assembly 146 but not shown in the Figures are a 4-slot I/O rack, a 16 pt. DC input card, a 16 pt. AC output card, a 42 watt rack-mounted power supply, a 750 VA control transformer, a 12 AMP motor contactor (IEC style) with an overload relay, a 24V, 4.8 AMP DC power supply, and a 30 AMP through-the-door disconnect/breaker switch. All machine functions, including wastegate 147 operation, are initiated and/or controlled by the use of soft keys on the Panelview as shown in FIG. 11.

The apparatus 10 also includes a chip and heat removal system that obviates the need for a fluid bath. The chip and heat removal system includes the large cutting blades 134 described above and a centrifugal fan portion 148 of the spindle 118 disposed beneath and rotating coaxially with the tool adapter head 126. In addition, timed air from pneumatic cylinder exhaust is directed to contain the chips in the removal system. A portion of the fan is shown at 148 in FIG. 2. The fan 148 and pressurized air force metal fragments from the forming tool 18 out of the spindle 118 through a hole (not shown) in the cylindrical casing 120 of the spindle 118. From the hole, the fan blows the chips along a length of flexible hose shown at 150 in FIG. 1 and into a cooling chamber (not shown).

The apparatus 10 includes the positive stop 40 to prevent workpieces 16 from overshooting the proximate position as the forming tool 18 is forming them. In other words, the positive stop 40 consistently arrests downward cutting motion at the same point so that forming depth will not vary with air pressure or speed.

The reciprocating stop surface 42 is a flat annular surface disposed on a reciprocating stop in the form of a metallic knurled ring shown at 152 in FIGS. 2 and 7–9. The knurled ring 152 is adjustably connected to the reciprocating portion 32 of the apparatus 10. More specifically, the knurled ring 152 is disposed in threaded engagement around an exteriorly threaded portion 154 of the cylindrical portion 86 of the lower piston 50. The position of the knurled ring 152 relative to the reciprocating portion 32 is therefore adjustable in a direction parallel to the forming axis 14. An operator can lengthen the forming stroke and thereby increase the forming depth on each workpiece 16 by turning the knurled ring 152 and moving it upward along the cylindrical portion 86 of the lower piston 50. Conversely, an operator can shorten the forming stroke and depth by moving the knurled ring 152 downward.

The reciprocator includes a lower limit switch, generally indicated at 156 in FIGS. 7–9, disposed in the path of the knurled ring 152 adjacent the stationary stop surface 44. The lower limit switch 156 is actuable by contact with the knurled ring 152 when the reciprocating portion 32 of the apparatus 10 is in the extended position. The lower limit switch 156 is configured to send a signal in response to .actuation that causes the compound hydro-pneumatic cylinder 30 to reverse direction, initiating the return stroke.

The lower limit switch 156 is supported on a tool steel block generally indicated at 158 in FIGS. 2 and 6–9. The cylindrical portion 86 of the lower piston 50 is disposed concentrically within a circular shaft, shown at 160 in FIG. 6, that extends vertically through the approximate center of the block 158 from a top surface of the block 158 to a bottom surface of the block 158. The top surface of the block 158 is also the stationary stop surface 44 of the positive stop 40. The diameter of the circular shaft 160 is sufficiently large to prevent the block 158 from contacting the cylindrical portion 86 of the lower piston 50 as the lower piston 50 travels up and down along the forming axis 14.

The block 158 has a rectangular channel 162 formed into its bottom surface. The channel 162 is sized to allow the block 158 to sit astride the stationary bronze guide plate 62. The block 158 is fastened to the bronze guide plate 62 by four fasteners (not shown) through four fastener holes 164. A back side of the block 158 includes a switch recess 166 shaped to receive and support the lower limit switch 156. As is best shown in FIG. 6, a circular aperture 168 extends downward from the upper surface 44 of the block 158 to intersect the switch recess 166. The lower limit switch 156 includes an actuator button, shown at 170 in FIGS. 7 and 8, that extends upward from a stationary switch body 172 of the lower limit switch 156 through the aperture 168 in the stationary stop surface 44. An upper portion of the actuator button 170 protrudes vertically from the circular aperture 168, above the stationary stop surface 44.

As explained above, the presence of the positive stop 40 prevents workpiece overshoot. The positive stop 40 also prevents workpiece undershoot by allowing the lower limit switch 156 to be supported in a higher position. Higher placement of the lower limit switch 156 insures that the reciprocating stop surface 42 will always hit the stationary stop surface 44 before the compound hydro-pneumatic cylinder 30 reverses—even at extremely slow reciprocation rates. Without the positive stop 40, the lower limit switch 156 must be placed at a lower intermediate position where an average reciprocating speed will result in a desired forming depth on each workpiece 16. With no positive stop to force a consistent reversal position, as the forming tool 18 dulls and the compound hydro-pneumatic cylinder 30 slows, the forming stroke will grow gradually shorter resulting in shallower workpiece 16 forming depths.

The apparatus 10 also includes an upper limit switch, shown at 174 in FIG. 1, supported on the stationary support frame 36 adjacent the workpiece transfer mechanism pivot linkage 114. A switch actuator fork 176 is fastened to a pivot shaft 178 of the pivot linkage 114 that extends through the support frame 36. The actuator fork 176 and upper limit switch 174 are positioned so that the pivot linkage 114 will cause the actuator fork 176 to actuate the upper limit switch 174 when the upper piston 46 reaches the top of its return stroke.

In operation, the air diverter valve 78 responds to upper limit switch 174 actuation by directing air through the upper air inlet tube 76 into the upper portion of the pneumatic cylinder 48 above the upper piston 46. This pneumatic pressure forces the upper piston 46 downward, initiating the forming stroke. During an initial portion of the forming stroke the upper piston 46 is driven rapidly downward without hydraulic dampening and with the lower piston 50 and grip chuck 12 remaining stationary. During this rapid undampened portion of the forming stroke the piston rod 38 and plunger 68 are driven downward and the pivot linkage 114 between the piston rod 38 and the transfer mechanism 20 positions an unformed workpiece 16 between the jaws 72 of the grip chuck 12. As the plunger 68 continues downward it forces the grip jaws 72 downward and into the gripped position—driving the jaws 72 over-center and clamping the unformed workpiece 16 between the jaws 72. As the jaws 72 clamp the workpiece 16 a lower surface of the plunger 68 may be brought to bear on the head of the unformed workpiece 16.

At this point the upper piston 46, piston rod 38 and plunger 68 continue their downward travel but also begin driving the grip chuck 12 and lower piston 50 downward. The lower piston 50 begins to move because, as described above, the lower piston 50 is secured to the grip chuck cross bar 66. As the lower piston 50 is drawn downward, hydraulic fluid is forced from the annular chamber 88 into the air-pressurized hydraulic reservoir 98 through the hydraulic tube 94 and valve 102. Therefore, during the final portion of the forming stroke the motion of the unformed workpiece 16 is hydraulically dampened as the workpiece 16 engages the forming tool 18.

At the completion of the downward forming stroke the knurled ring 152 of the positive stop 40 depresses the lower limit switch actuator button 170, actuating the lower limit switch 156. The lower limit switch 156 sends an electrical signal to the solenoid within the air diverter valve 78, causing the diverter valve 78 to direct pressurized air through the lower air inlet tube and into the lower portion of the pneumatic cylinder 48. Either simultaneous with lower limit switch 156 actuation or shortly thereafter, the knurled ring 152 contacts the stationary stop surface 44, ending the downward forming stroke. The pressurized air flowing into the lower portion of the pneumatic cylinder 48 then begins to drive the upper piston 46 upward, initiating the return stroke.

As the upper piston 46 moves upward on the initial portion of the return stroke it carries with it the piston rod 38, the plunger, the grip chuck 12, the newly-cut workpiece 16 and the lower piston 50. As the lower piston 50 moves upward it draws hydraulic oil through the hydraulic line from the hydraulic reservoir 98 and into the expanding annular chamber 88. After the lower piston 50 and grip chuck cross bar 66 have reached the upper limit of their travel, and with the grip chuck cross bar 66 contacting the stationary bronze guide plate 62, the plunger continues to pull the jaws 72 of the grip chuck 12 upward. The plunger pulls the jaws 72 over-center which causes the jaws 72 to release the newly-cut workpiece 16. As the upper piston 46 reaches the end of the return stroke, the upper limit switch 174 is actuated through the pivot linkage 114, re-initiating the downward forming stroke and workpiece transfer.

During the fastener forming process, the compound hydraulic-pneumatic cylinder 48 provides vertical workpiece 16 movement that is substantially faster than the movement that the cams or chains of standard mechanical devices can provide. Because the forming process is faster, the forming tool 18 does not require lubricant. The hydraulic cylinder 52 also extends the life of the forming tool 18 by acting as a shock-absorbing cushion during the forming process and during downward movement of the workpiece into the forming tool 18. While some hydraulically-dampened systems may lack precision due to undershoot and overshoot problems, the positive stop 40 allows operators to precisely and consistently control forming stroke length.

Cycle time is the sum of the total time it takes to load and cut each workpiece 16. The cutting feed rate is preset and is limited by the maximum speed at which a workpiece 16 can be fed into the forming tool 18 and effectively formed. However, the non-forming, or "workpiece transfer" portion of the cycle is both manually adjustable and self-regulating. An operator can, therefore, change the overall cycle speed by increasing or decreasing the part transfer speed, i.e., the speed at which the workpiece transfer mechanism 20 feeds individual unformed workpieces 16 into the forming tool 18. The speed of the workpiece transfer portion of the cycle is dependent on cutting load, pneumatic pressure, and the size of a one-way restricting variable orifice within the dampening valve 102. Workpiece transfer rate is increased by higher pneumatic input pressure to the compound cylinder 30, reduced cutting load, and/or increased dampening valve 102 orifice size. Conversely, workpiece transfer rate is decreased by lower pneumatic input pressure, higher cutting loads, and/or decreased dampening valve orifice size. The pneumatic input pressure is typically set at 100 psi. However, the system will operate with input pressures as low as 60 psi. Operators typically adjust the workpiece transfer rate by adjusting the dampening valve 102. This changes the size of the orifice in the dampening valve 102 and therefore the rate at which the lower piston 84 can force hydraulic oil from the annular chamber 88 of the hydraulic cylinder 52 into the air-pressurized oil reservoir 98 as the reciprocating portion 32 of the apparatus 10 moves downward on a forming stroke.

The apparatus 10 includes a height adjuster connected between the forming tool 18 and the gripper 12. The height adjuster is configured to allow an operator to adjust forming depth by adjusting the relative distance between the forming tool 18 and gripper 12 as measured along the forming axis 14 in the proximate position. By operating the height adjuster, an operator can adjust the relative distance between the forming tool 18 and gripper 12 by adjusting the height of the rotator 116 that carries the forming tool 18.

The height adjuster allows a forming machine constructed according to the present invention to accommodate different length workpieces 16. It also improves service access to the forming tool 18 by allowing an operator to easily lower the rotator 116 and forming tool 18 to the position shown in FIG. 1.

Figure 10:
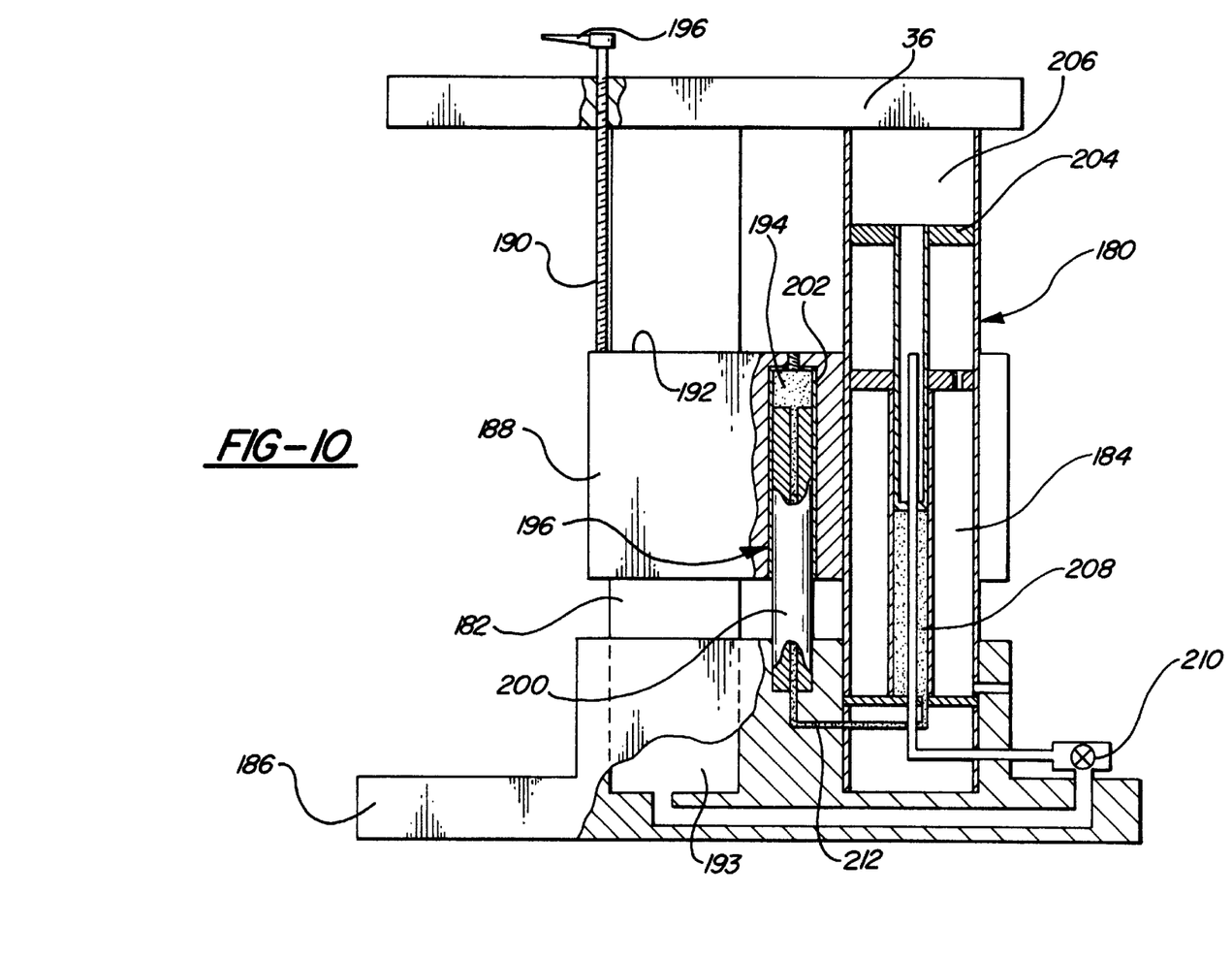
FIG. 10 is a partially cut-away, partial cross-sectional front view of a pneumatic slide lift feature of the fastener forming apparatus of FIG. 1.

As is shown in FIGS. 1 and 10, the height adjuster includes a pneumatic slide lift 180. The pneumatic slide lift 180 includes an air holding cylinder 182 and a pneumatic cylinder 184 that support the support frame 36 above a base 186. A slide bracket 188 is slidably mounted for vertical movement on the air holding cylinder 182 and the pneumatic cylinder 184. The rotator 116 and forming tool 18 are supported on the slide bracket 188 as is best shown in FIG. 1. A threaded height adjustment stop rod 190 is threaded through a portion of the support frame 36 and extends vertically downward to abut an upper surface 192 of the slide bracket 188. As is explained in greater detail below, the slide bracket 188 is upwardly biased by pressurized air 193 and hydraulic fluid 194 within the cylinders 182, 184 and is adjustably held down by the stop rod 190, i.e., an upwardly directed hydro-pneumatic biasing force. When an operator screws the rod downward using a ratchet shown at 196 in FIGS. 1 and 10, the slide bracket 188 is moved downward against the upward hydro-pneumatic biasing force. When an operator uses the ratchet 196 to screw the stop rod 190 upward, the biasing force drives the slide bracket 188 upward. In this way the height of the forming tool 18 is vertically adjustable relative to the grip chuck 12 to accommodate various workpiece lengths.

The slide lift 180 also includes a telescoping vertical center support cylinder generally indicated at 198 in FIG. 10. The center support cylinder 198 is connected between the base 186 and the slide bracket 188 between the air holding cylinder 182 and the pneumatic cylinder 184 as shown in FIG. 10. The air holding cylinder 182, pneumatic cylinder 184 and a lower stationary portion 200 of the telescoping center support cylinder 198 are fixed to the base 186. The support frame 36 is vertically supported on an upper telescoping portion 202 of the center support cylinder 198. The upper telescoping portion 202 of the center support cylinder 198 is slidably supported on the lower stationary portion 200. A fluid seal is disposed between the upper telescoping portion 202 and the lower stationary portion 200. The pneumatic cylinder 184 contains a single annular piston 204 disposed between an upper cylinder region 206 filled with pressurized air and a lower cylinder region 208 filled with hydraulic oil. The air holding cylinder 182 serves as an air reservoir and is in fluid communication with the upper cylinder region 206 through a solenoid operated air valve 210. A hydraulic channel 212 between the lower cylinder region 208 and the telescoping support cylinder 196 allows hydraulic oil to flow freely between the lower cylinder region 208 and the support cylinder 196. When the stop rod 190 is retracted upward, the constant downward pressure exerted by the air from the air holding cylinder 182 causes hydraulic oil to flow from the lower cylinder region 208 and into the telescoping center support cylinder 196. As the oil passes into the support cylinder 196 it forces the upper telescoping portion 202 of the center support cylinder 196 to move upward, carrying with it the slide bracket 188.

The forming tool 18 and rotator 116 may be lowered to a fully down position shown in FIG. 1 without advancing the stop rod 190 downward. This is accomplished by releasing the air charge from the air holding cylinder 182 and opening the solenoid air valve 210 to allow air to flow out of the upper cylinder region 206. This allows the piston 204 to move upward in the pneumatic cylinder 184 which allows hydraulic oil to move from the support cylinder 196 to the lower cylinder region 208 of the pneumatic cylinder 184. As a result, the telescoping portion 202 of the center support cylinder 196 moves downward, carrying with it the slide bracket 188 and rotator 116.

The apparatus 10 includes a removable sorter attachment comprising an electrically-conductive detection ring 137 coaxially supportable on the rotator 116 in a position coaxially aligned with and spaced from the part gripper 12. The detection ring 137 is pre-selected to have an inner diameter that defines the aperture 250 and is slightly larger than an outer diameter of workpieces 16 to be sorted. The detection ring 137 is configured to encircle a portion of a relatively straight workpiece 16 held in the gripper 12 when the gripper 12 and detection ring 137 are in the proximate position, the workpiece 16 being withdrawn from the detection ring when the gripper 12 and detection ring 137 are in the remote position as shown in FIG. 2. The detection ring 137, the support frame 36, the reciprocator 30, the gripper 12 and a workpiece 16 held in the gripper 12 define an electrical circuit. The circuit is completed when a workpiece 16 contacts the detection ring 137. An electrical power source is connected into the circuit. An electrically actuated bent workpiece diverter is also connected into the circuit. The workpiece diverter includes the wastegate 147, the solenoid air valve 153 and the air cylinder 155 shown in FIG. 13. The workpiece diverter is operable to shunt bent workpieces 16 away from the exit chute 22 (as described above in connection with the PLC description) when the bent workpieces 16 contact the detection ring 137 and complete the electrical circuit.

The description and drawings illustratively set forth our presently preferred invention embodiments. We intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

What is claimed is:

1. A fastener forming apparatus for forming fasteners from cylindrical workpieces, the apparatus comprising:

a workpiece gripper supported along a forming axis and configured to releasably grip and carry a generally cylindrical workpiece in a coaxial disposition along the forming axis;

a forming tool spaced from the gripper along the forming axis;

at least one of the workpiece gripper and tool supported for relative reciprocal motion along the axis between a remote position and a proximate position, the gripper and tool disposed farther apart in the remote position than in the proximate position;

a workpiece transfer mechanism configured to sequentially transfer a series of workpieces into the workpiece gripper and to drive preceding workpieces out of the workpiece gripper and onto an exit path;

a reciprocator operatively connected to a reciprocating portion of the apparatus, the reciprocating portion of the apparatus comprising one of the workpiece gripper and tool, to drive one of the workpiece gripper and tool between the extended and retracted positions, the reciprocator having a stationary end connected to a stationary support and a reciprocating end operatively connected to the reciprocating portion of the apparatus, the stationary end being hydro-pneumatically coupled to the reciprocating end, the motion of the reciprocating end and the reciprocating portion of the apparatus being hydraulically dampened;

a sorter attachment comprising:

an electrically-conductive detection ring supported in a position coaxially aligned with and spaced from the workpiece gripper, the detection ring having an inner diameter slightly larger than an outer diameter of each workpiece in a series of workpieces to be sorted;

the detection ring configured to encircle a portion of a relatively straight workpiece held in the gripper when the gripper and detection ring are in the proximate position, the workpiece being withdrawn from the detection ring when the gripper and detection ring are in the remote position;

an electrical circuit comprising the detection ring, the gripper and a workpiece held in the gripper, the circuit being completed when a workpiece contacts the ring;

an electrical power source connected into the circuit;

an electrically actuated bent workpiece diverter connected into the circuit and mechanically supported adjacent the workpiece exit path, the workpiece ejector operable to shunt bent workpieces away from the exit path when the bent workpieces contact the detection ring and complete the electrical circuit.

2. A fastener sorting apparatus comprising:

a workpiece gripper configured to releasably grasp and hold a generally cylindrical workpiece in a coaxial disposition along an axis;

electrically-conductive detection ring coaxially aligned with and spaced from the workpiece gripper, the detection ring pre-selected to have an inner diameter slightly larger than an outer diameter of each workpiece in a series of workpieces to be sorted;

at least one of the workpiece gripper and detection ring supported for relative reciprocal motion along the axis between a remote position and a proximate position, the workpiece gripper and detection ring being positioned farther apart in the remote position than in the proximate position;

a workpiece transfer mechanism configured to sequentially transfer a series of workpieces into the workpiece gripper and to drive preceding workpieces out of the workpiece gripper and onto an exit path when the gripper and detection ring are in the remote position;

the detection ring configured to encircle a portion of a relatively straight workpiece held in the gripper when the gripper and detection ring are in the proximate position, the workpiece withdrawn from the detection ring when the gripper and detection ring are in the remote position;

a reciprocator operatively connected to one of the workpiece gripper and detection ring to drive one of the workpiece gripper and detection ring between the extended and retracted positions, the reciprocator having a stationary end connected to a stationary support and a reciprocating end operatively connected to one of the workpiece gripper and the detection ring, the stationary end being hydro-pneumatically coupled to the reciprocating end, the motion of the reciprocating end being hydraulically dampened;

an electrical circuit including the detection ring, the gripper and a workpiece held in the gripper, the circuit being completed if a workpiece contacts the detection ring;

an electrical power source connected into the circuit; and a bent workpiece diverter electrically connected into the circuit and mechanically supported adjacent the workpiece exit path, the workpiece ejector operable to shunt bent workpieces away from the exit path when the bent workpieces contact the detection ring and complete the electrical circuit.

3. A fastener sorting apparatus as defined in claim 2 in which the reciprocator includes a compound hydro-pneumatic cylinder connected between the stationary end and the reciprocating end of the reciprocator.

4. A fastener sorting apparatus as defined in claim 3 in which the hydro-pneumatic cylinder is connected to a stationary support and includes a reciprocating piston rod that extends from a piston portion of the cylinder and operatively connects the cylinder to one of the workpiece gripper and the ring.

5. A fastener forming apparatus for forming fasteners from cylindrical workpieces, the apparatus comprising:

a workpiece gripper supported for reciprocal movement along a forming axis and configured to releasably grip and carry a generally cylindrical workpiece in a coaxial disposition along the forming axis;

a forming tool spaced from the gripper along the forming axis;

at least one of the workpiece gripper and tool supported for relative reciprocal motion along the axis between a remote position and a proximate position, the gripper and tool disposed farther apart in the remote position than in the proximate position;

a workpiece transfer mechanism configured to sequentially transfer a series of workpieces into the workpiece gripper and to drive preceding workpieces out of the workpiece gripper and onto an exit path;

a reciprocator operatively connected to a reciprocating portion of the apparatus, the reciprocating portion of the apparatus comprising one of the workpiece gripper and tool, to drive one of the workpiece gripper and tool between the extended and retracted positions, the reciprocator having a stationary end connected to a stationary support and a reciprocating end operatively connected to the reciprocating portion of the apparatus, the stationary end being hydro-pneumatically coupled to the reciprocating end, the motion of the reciprocating end and the reciprocating portion of the apparatus being hydraulically dampened;

a sorter attachment comprising:

an electrically-conductive detection ring supported in a position coaxially aligned with and spaced from the workpiece gripper, the detection ring having an inner diameter slightly larger than an outer diameter of each workpiece in a series of workpieces to be sorted;

the detection ring configured to encircle a portion of a relatively straight workpiece held in the gripper when the gripper and detection ring are in the proximate position, the workpiece being withdrawn from the detection ring when the gripper and detection ring are in the remote position;

an electrical circuit comprising the detection ring, the gripper and a workpiece held in the gripper, the circuit being completed when a workpiece contacts the ring;

an electrical power source connected into the circuit;

an electrically actuated bent workpiece diverter connected into the circuit and mechanically supported adjacent the workpiece exit path, the workpiece ejector operable to shunt bent workpieces away from the exit path when the bent workpieces contact the detection ring and complete the electrical circuit; and a positive stop including a reciprocating stop surface disposed on the reciprocating portion of the apparatus in a position to engage a stationary stop surface when the workpiece gripper and tool are in the proximate position to prevent the reciprocator from causing the reciprocating portion of the apparatus to overshoot or undershoot the extended position.

* * * * *